(12) United States Patent
Faulhaber et al.

(10) Patent No.: US 12,535,621 B2
(45) Date of Patent: Jan. 27, 2026

(54) SURFACE COATING FOR OPTICAL EMITTER COMPONENTS

(71) Applicant: Lumentum Operations LLC, San Jose, CA (US)

(72) Inventors: Richard D. Faulhaber, San Carlos, CA (US); Martin H. Muendel, Oakland, CA (US)

(73) Assignee: Lumentum Operations LLC, San Jose, CA (US)

(*) Notice: Subject to any disclaimer, the term of this patent is extended or adjusted under 35 U.S.C. 154(b) by 115 days.

(21) Appl. No.: 18/194,309

(22) Filed: Mar. 31, 2023

(65) Prior Publication Data

US 2024/0280732 A1 Aug. 22, 2024

Related U.S. Application Data

(60) Provisional application No. 63/486,106, filed on Feb. 21, 2023.

(51) Int. Cl.
  *G02B 1/18* (2015.01)
  *G02B 6/02* (2006.01)
  *G02B 6/12* (2006.01)

(52) U.S. Cl.
  CPC ........... *G02B 1/18* (2015.01); *G02B 6/02052* (2013.01); *G02B 6/02095* (2013.01); *G02B 2006/12121* (2013.01)

(58) Field of Classification Search
  None
  See application file for complete search history.

(56) References Cited

U.S. PATENT DOCUMENTS

| | | | | |
|---|---|---|---|---|
| 5,883,992 | A * | 3/1999 | Gonthier | G02B 6/2835 385/43 |
| 5,999,681 | A * | 12/1999 | Grabbe | C03C 25/105 65/435 |
| 9,982,156 | B1 * | 5/2018 | Lohmeier | G02B 1/113 |
| 2015/0329415 | A1 * | 11/2015 | Bellman | B32B 7/06 428/141 |
| 2016/0370543 | A1 * | 12/2016 | Ocampo | G02B 6/02395 |

FOREIGN PATENT DOCUMENTS

DE 2841831 A * 4/1980 ......... C03C 25/1065

* cited by examiner

*Primary Examiner* — David Sample
(74) *Attorney, Agent, or Firm* — Harrity & Harrity, LLP

(57) ABSTRACT

In some implementations, an optical component includes an optical medium, the optical medium having a surface, wherein the surface includes one or more hydroxyl group terminations; and a surface layer chemically bonded to the optical medium, such that the surface layer has a thickness of less than 10 nanometers and is a hydrophobic surface, the surface layer including at least one of: a hexamethyldisilazane material, a polysiloxane material, a polydimethylsiloxane material, a fluoro-polymer material, an organosilicon material, or an organofluorine material.

12 Claims, 8 Drawing Sheets

SURFACE COATING FOR OPTICAL EMITTER COMPONENTS

CROSS-REFERENCE TO RELATED APPLICATION

This Patent Application claims priority to U.S. Provisional Patent Application No. 63/486,106, filed on Feb. 21, 2023, and entitled "SURFACE COATING FOR OPTICAL EMITTER COMPONENTS." The disclosure of the prior Application is considered part of and is incorporated by reference into this Patent Application.

TECHNICAL FIELD

The present disclosure relates generally to optical components and to optical components with a hydrophobic surface coating.

BACKGROUND

Optical systems, such as optical communications systems, optical sensing systems, fiber laser systems, or optical measurement systems, among other examples, may include optical media for conveying optical signals. For example, an optical system may include an optical fiber or another type of optical component, in which an optical beam can be directed. One technique for manufacturing an optical medium, such as an optical fiber, is to use a crucible method, in which powdered silica is melted and formed into a cylindrical optical fiber. Another technique for manufacturing an optical medium, such as an optical fiber, is to use a vapor deposition method, in which vaporized materials are deposited onto an interior surface of a cylindrical substrate to manufacture a preform. Fiber drawing is a process in which an optical fiber is drawn out of the preform, under heat, to manufacture the optical medium.

SUMMARY

In some implementations, an optical component includes an optical medium, the optical medium having a surface, wherein the surface includes one or more hydroxyl group terminations; and a surface layer chemically bonded to the optical medium, such that the surface layer has a thickness of less than 10 nanometers and is a hydrophobic surface, the surface layer including at least one of: a hexamethyldisilazane material, a polysiloxane material, a polydimethylsiloxane material, a fluoro-polymer material, an organosilicon material, or an organofluorine material.

In some implementations, a method includes forming an optical fiber, the optical fiber, having a first surface chemistry; and treating the optical fiber with a surface treatment, the optical fiber, based on being treated, having a monolayer with a second surface chemistry, the second surface chemistry being more hydrophobic than the first surface chemistry.

In some implementations, an optical system includes an optical medium, the optical medium having a surface layer chemically bonded to an exterior of the optical medium, such that the surface layer is a hydrophobic surface, wherein the surface layer is a hexamethyldisilazane (HMDS) layer bonded to the exterior; and a coating material, wherein the coating material covers a portion of the optical medium not covered by the surface layer.

DETAILED DESCRIPTION

The following detailed description of example implementations refers to the accompanying drawings. The same reference numbers in different drawings may identify the same or similar elements.

Optical fibers and other optical media are used extensively in optical communications systems and other optical systems for conveying a beam. For example, a silica-based optical fiber may be aligned to a laser (e.g., a vertical-cavity surface-emitting laser (VCSEL) or an edge-emitting laser (EEL)) to convey a beam toward another optical component. During fiber manufacturing, a draw process is performed to coat a glass optical fiber, increase a mechanical strength of the glass optical fiber, and/or protect the glass optical fiber from an environment, among other examples. Coating materials may include polymer materials or metallic materials, among other examples. For example, for high-power fiber laser applications, a glass optical fiber may be formed from fused silica including various glass cladding layers and various dopant materials and may be coated with a fluorinated polymer primary coating and an additional protective coating. A coating material can be applied to an optical fiber during the draw process, which preserves a surface of the optical fiber and protects the optical fiber from environmental degradation. Similarly, other optical components may use optical media.

FIGS. 1A-1E are diagrams of an example optical component 100 that is processed, such that the example optical component 100 has a hydrophilic surface.

Figure 1A:
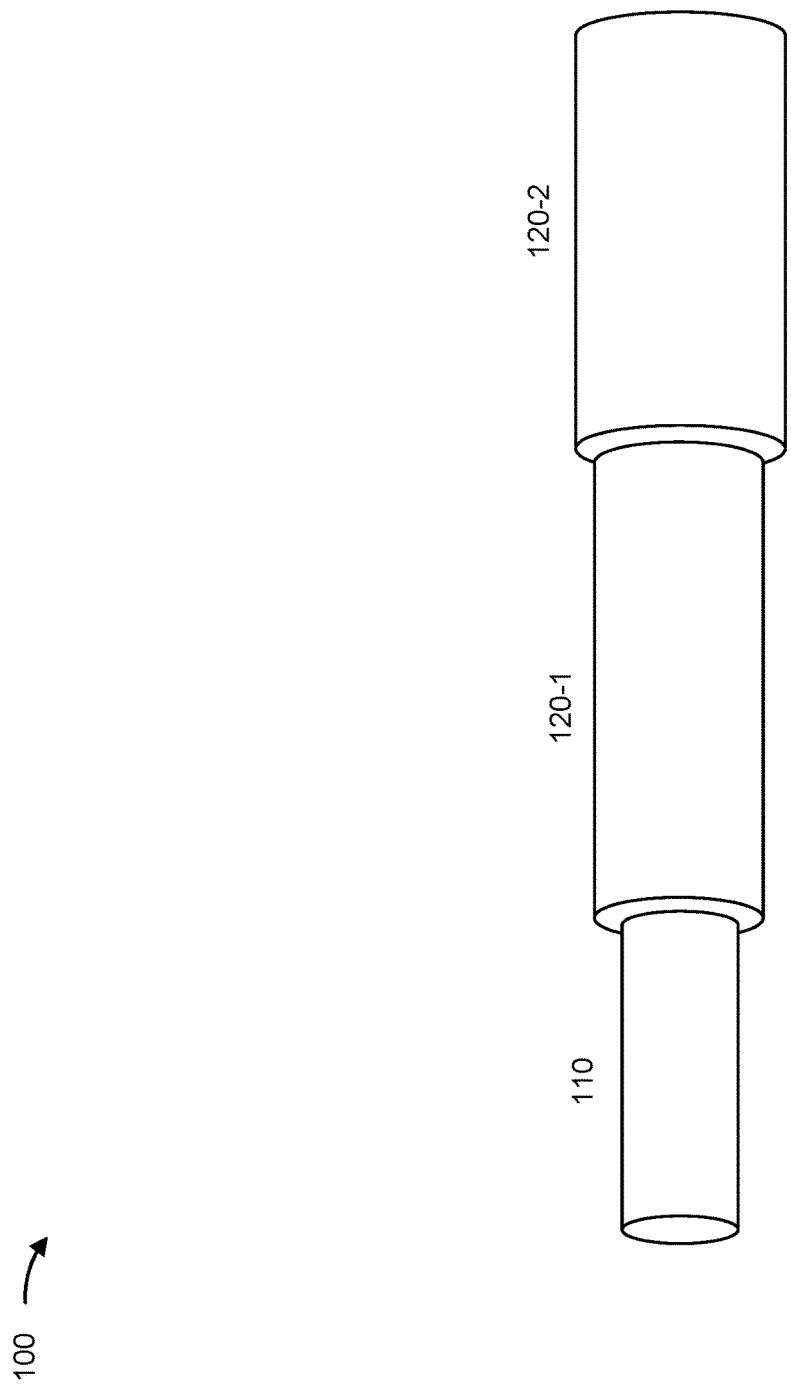
FIGS. 1A-1E are diagrams of an example optical component with a hydrophilic surface.

As shown in FIG. 1A, the optical component 100 may include an optical medium 110, a first coating 120-1, and a second coating 120-2. The optical medium 110 may include a silica-based glass medium for conveying an optical beam. Other examples of optical media include fluoride-based media, phosphate-based media, chalcogenide-based media, or crystal-based media, among other examples. In one example, the optical medium 110 may be a fused silica optical fiber including various glass cladding layers and various dopant materials. In some examples, the fused silica optical fiber may have a non-crystalline amorphous structure, with high purity, high optical transmission, and low hydroxyl (OH) content. In some examples, the optical medium 110 may be formed using a crucible method, an extrusion method, or a chemical vapor deposition method, among other examples. For example, in the chemical vapor deposition method, a cylindrical preform is manufactured by depositing layers of material (e.g., silicon dioxide or doped silicon dioxide) on an inside surface of a hollow substrate rod. The preform may then be collapsed into a rod and may be drawn into a fiber. During or after the fiber drawing process, polymer coatings may be formed on the outside surface of the fiber. The polymer coatings may include a first coating 120-1 or a second coating 120-2, among other examples.

Coatings 120 may be protective coatings in which the optical medium 110 is formed or which are cladded onto the optical medium 110. In some examples, the coatings 120 may form, with an exterior surface of the optical medium 110, a reflector to maintain an optical path of an optical beam within the optical medium 110 (e.g., and without energy dissipation). For example, the first coating 120-1 may include a low refractive index fluorinated polymer primary coating and the second coating 120-2 may include a high refractive index protective coating (e.g., another polymer coating or a metallic coating, among other examples). In this case, by forming a reflector from a layering of a low refractive index coating 120-1 with a high refractive index coating 120-2 around the optical medium 110, an optical beam can be confined within the optical medium 110.

Figure 1B:
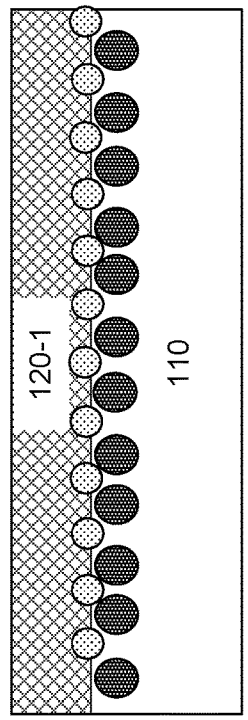
Figure 1C:
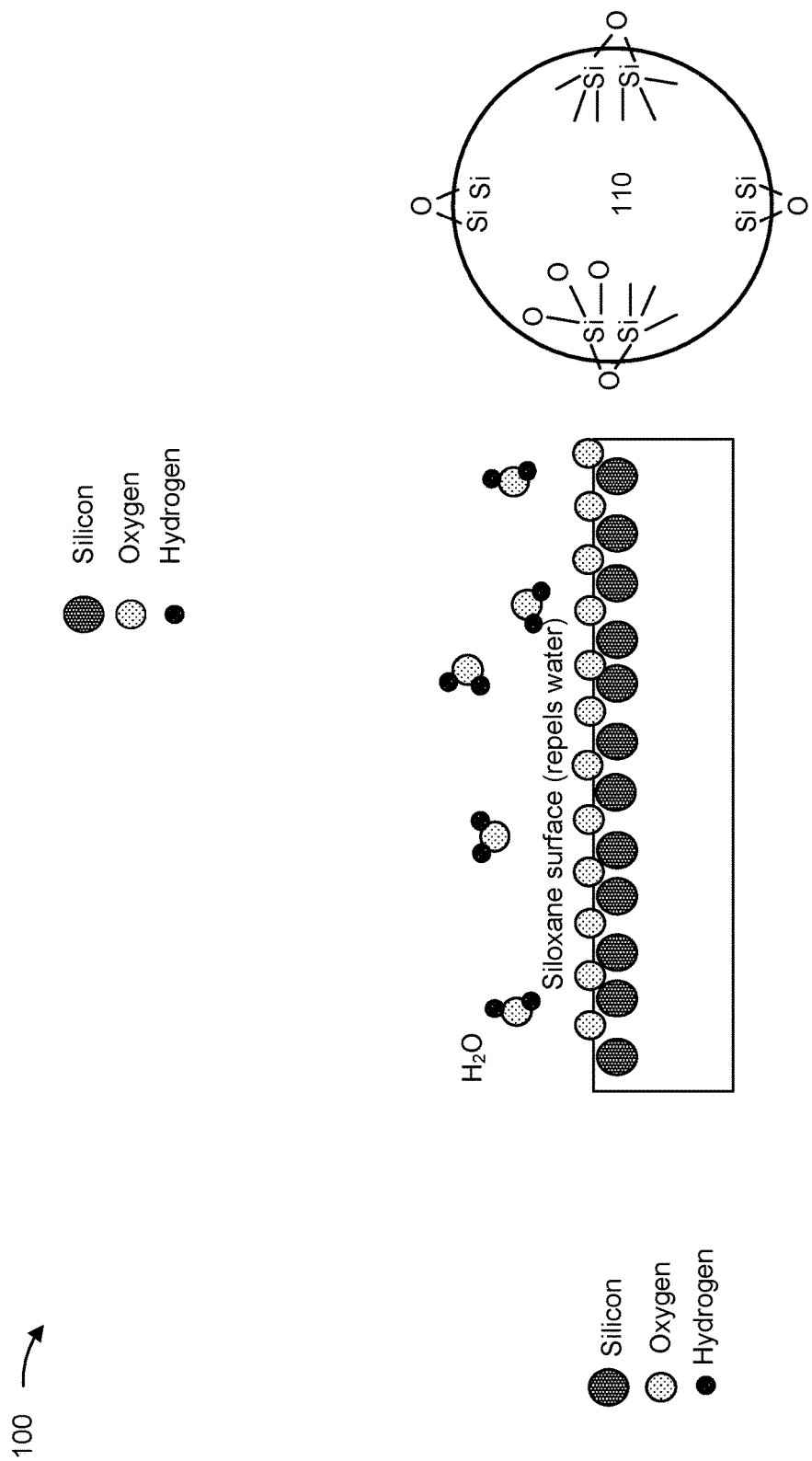

As shown in FIG. 1B, a surface of the optical medium 110 (e.g., at an interface with the first coating 120-1) may include a siloxane (SiO) layer of a set of siloxane molecules. The first coating 120-1 preserves the siloxane layer at the surface of the optical medium 110, which allows the optical component 100 to be stored and transported without damage to performance of the optical medium. The siloxane layer is a highly hydrophobic layer in which each surface oxygen (O) atom is bonded to two silicon (Si) atoms, thereby preventing water ($H_2O$) molecules from bonding, as shown in FIG. 1C.

However, during processing of an optical fiber, such as in manufacturing a laser or laser component, the optical fiber (e.g., the optical medium 110) may be processed, which may include stripping the polymer coating (e.g., the coating layers 120) from at least a portion of the optical fiber. Similar coating removal processes may be applied to other optical media during manufacture of other optical systems or optical devices. Although a surface, after manufacture of the optical fiber, may include siloxane molecules that are highly hydrophobic, as described above, stripping of the polymer coating and processing of the optical fiber (e.g., heating) can alter the surface. For example, the surface of the optical fiber may transition from a surface layer of siloxane molecules to a surface layer of silanol molecules. Unlike the hydrophobic siloxane molecules, the silanol molecules are hydrophilic. In other examples, different processing techniques may result in an optical medium 110 having a neutral surface or a slightly hydrophobic surface (e.g., but less hydrophobic than the siloxane-based surface or less hydrophobic than is desirable for a particular use case).

Figure 1D:
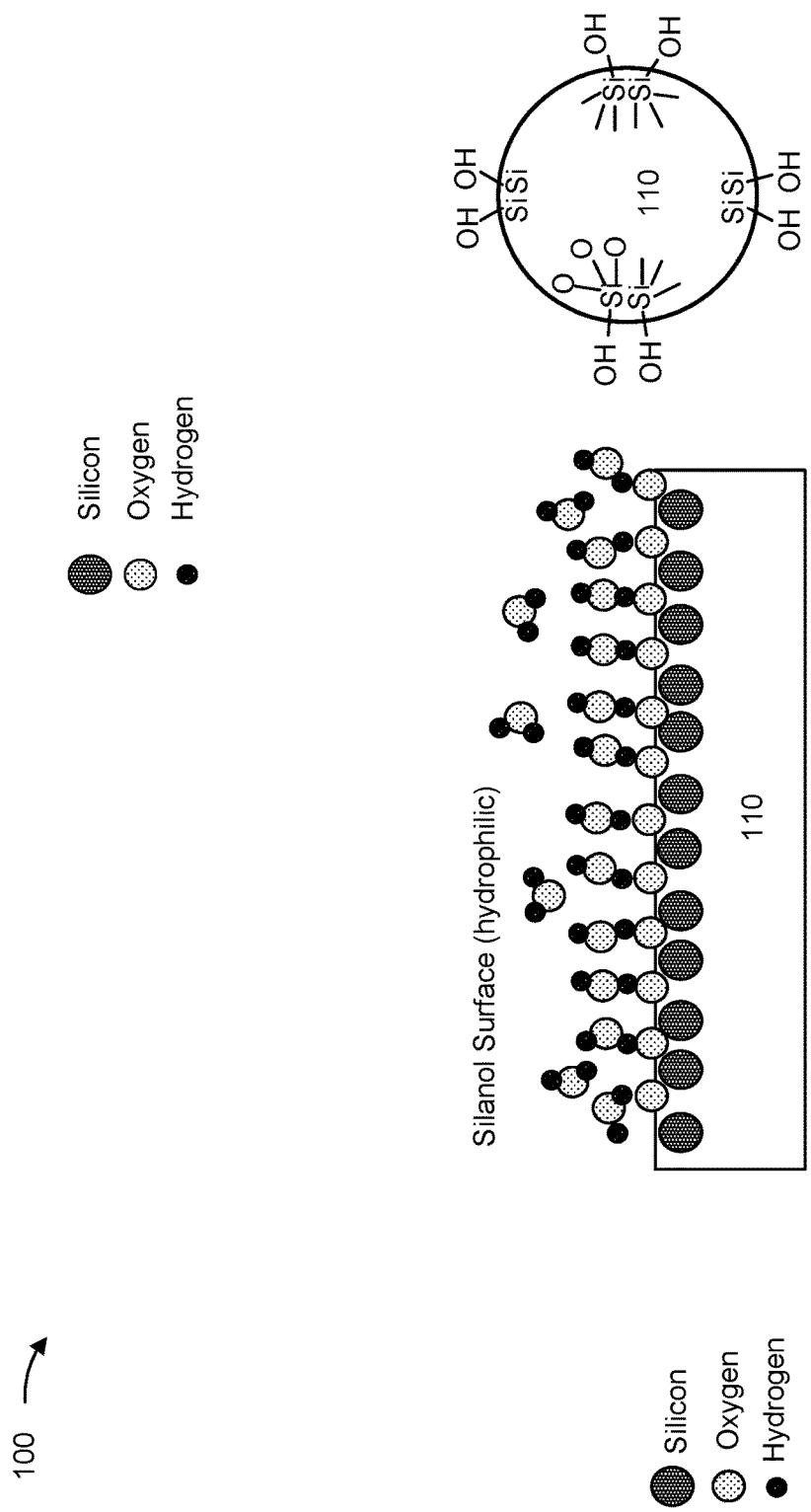

As shown in FIG. 1D, during processing of the optical component 100 (e.g., to fuse a first optical fiber to a second optical fiber), a portion of the first coating 120-1 (and the second coating 120-2) is removed, which exposes the surface of the optical medium 110. The optical medium 110 is further subjected to processing conditions, such as heating and fusing, which alters a surface chemistry of the optical medium 110. For example, the siloxane surface of the optical medium 110 transitions into a silanol surface with a set of silanol groups, thereby resulting in a hydrophilic surface for the optical medium 110. In this case, the silanol groups have corresponding hydroxyl terminations that allow water molecules to bond with the silanol groups, enabling deposition of contaminants and/or allowing hydrolysis-based propagation of microcracks already present or that develop in or on the surface of the optical medium 110.

Atmospheric water molecules, attracted by the surface silanol molecules, can deposit contaminants on the surface of the optical fiber. The surface contaminants can, based on a beam reflecting along an optical path through the optical fiber, absorb some energy of the beam (e.g., based on the beam reflecting off an interior of the surface of the optical fiber at an area that has a contaminant on an exterior of the surface of the optical fiber). This energy absorption can result in excessive heating of the optical fiber, which can result in poor performance of an optical system and/or degradation and failure of the optical fiber. Similarly, a surface of the optical fiber may have microcracking, as a result of the manufacturing and/or further processing. Water molecules can cause a hydrolysis reaction at a microcrack, which may further propagate the microcrack. Hydrolysis reactions are a particular problem when a surface of an optical fiber includes silanol groups because a silanol (Si—OH) bond is easier to break than a siloxane (Si—O) bond, resulting in greater microcrack propagation when the surface of the optical fiber includes silanol molecules.

Figure 1E:
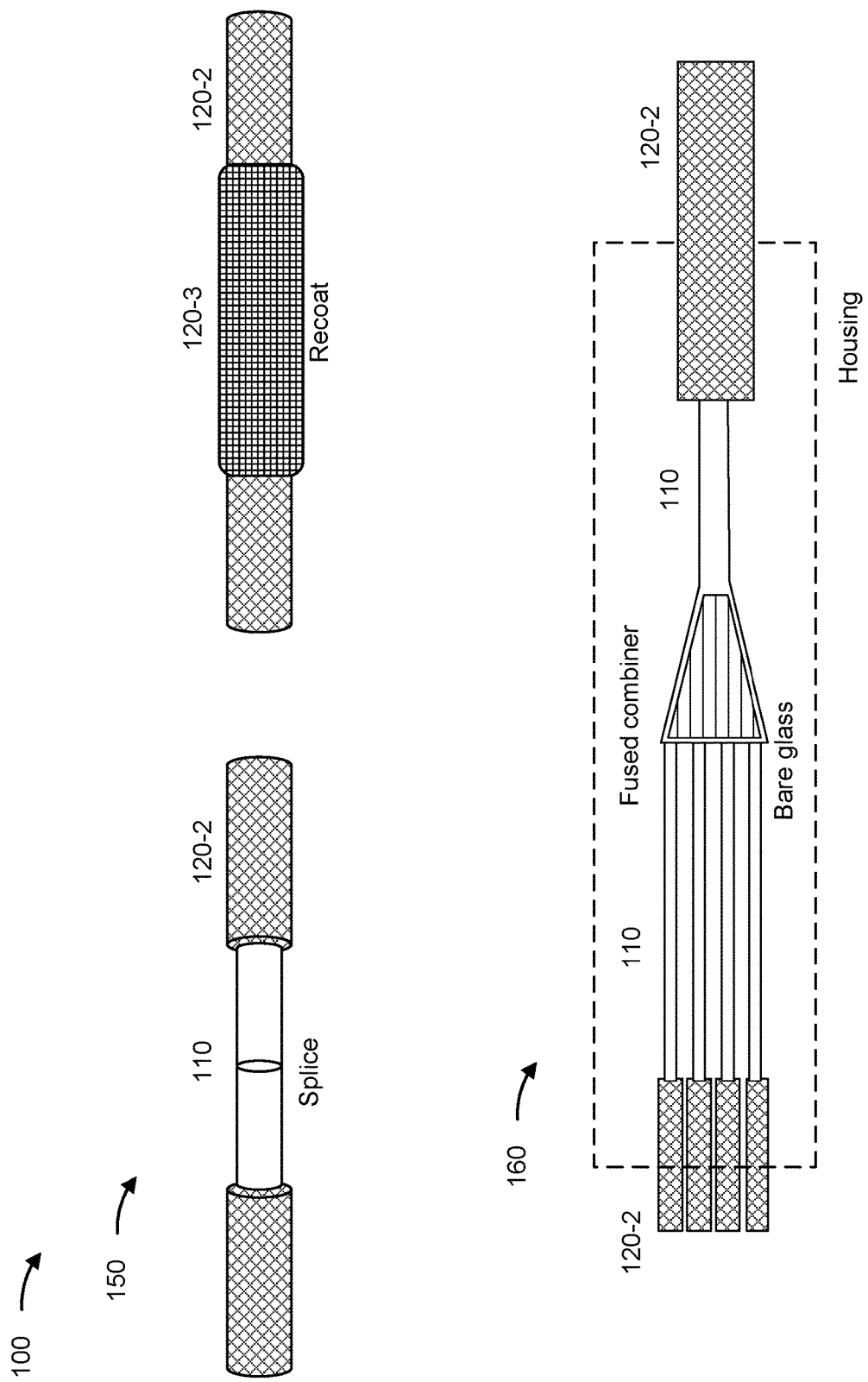

As shown in FIG. 1E, in a first example 150 of splicing two optical fibers that include the optical medium 110, a recoat procedure is performed to isolate the optical medium 110. For example, a third coating 120-3 is deposited on a surface of the optical medium 110 and/or onto the first coating 110-1 and/or the second coating 110-2, thereby isolating the optical medium 110 from an environment and associated deposition of contaminants and/or hydrolysis. Although recoating materials can be applied, after processing of an optical fiber, to protect the optical fiber from atmospheric water molecules (and other contaminants), the recoating materials may not bond well to the optical fiber when portions of the optical fiber have different diameters (e.g., as a result of splicing together two optical fibers or tapering an optical fiber). For more complicated optical components, such as fused combiners, which have multiple optical fibers within a small area, re-coating may not be practical as a result of spatial geometry limitations within the fused combiner. In this case, as shown in a second example 160 of a fused combiner that includes the optical medium 110, a housing is disposed around the optical medium 110 to isolate the optical medium 110 (e.g., to limit an exposure of the optical medium 110 to atmospheric water molecules (among other contaminants)). However, use of a housing module may prevent installation of optical components into increasingly miniaturized optical devices and systems.

As indicated above, FIGS. 1A-1E are provided as examples. Other examples may differ from what is described with regard to FIGS. 1A-1E.

Some implementations described herein apply a surface treatment layer to an optical medium, such as an optical fiber, in connection with processing of the optical medium to cause the optical medium to have a hydrophobic surface rather than a hydrophilic surface, which is associated with silanol groups present on a surface of the optical medium after processing (or a more hydrophobic surface rather than a neutral or only slightly hydrophobic surface). For example, an organosilicon (e.g., hexamethyldisilazane (HMDS)) chemical treatment layer may be applied to a surface of an optical medium, which may result in a changed chemistry of the surface of the optical medium. In this case, hydroxyl groups (e.g., silanol terminations) on a surface of the optical medium form, with, for example, HMDS a monolayer protective coating (e.g., an HMDS layer) on the optical medium. In other words, rather than a silica-based optical fiber (or other type of optical fiber or optical component) with a surface layer of hydroxyl groups, the silica optical fiber includes a surface layer of oxygen molecules, each having an HMDS group. The exposed HMDS groups form a hydrophobic surface, thereby preventing or reducing atmospheric water and/or other surface contaminants from depositing on the surface. Other examples of surface layers include other organosilicon-based layers, including polysiloxane layers such as polydimethylsiloxane layers, as well as organofluorine-based layers such as fluoro-polymer layers, among other examples. By forming a monolayer hydrophobic coating, the optical medium can be coated with a thickness (e.g., of an HMDS layer) of less than 10 nanometers (nm), thereby reducing a thickness associated with a protected optical medium relative to other types of coatings.

In some examples, the hydrophobic surface also reduces microcrack propagation. For example, the hydrophobic surface, resulting from formation of the HMDS layer or another layer on an optical medium, resists hydrolysis-based microcrack propagation. In this way, the use of an HMDS treatment (or another type of treatment) can reduce a need to provide a recoating or housing for optical components, such as optical media, thereby reducing manufacturing complexity and/or enabling further miniaturization of optical components.

Figure 2:
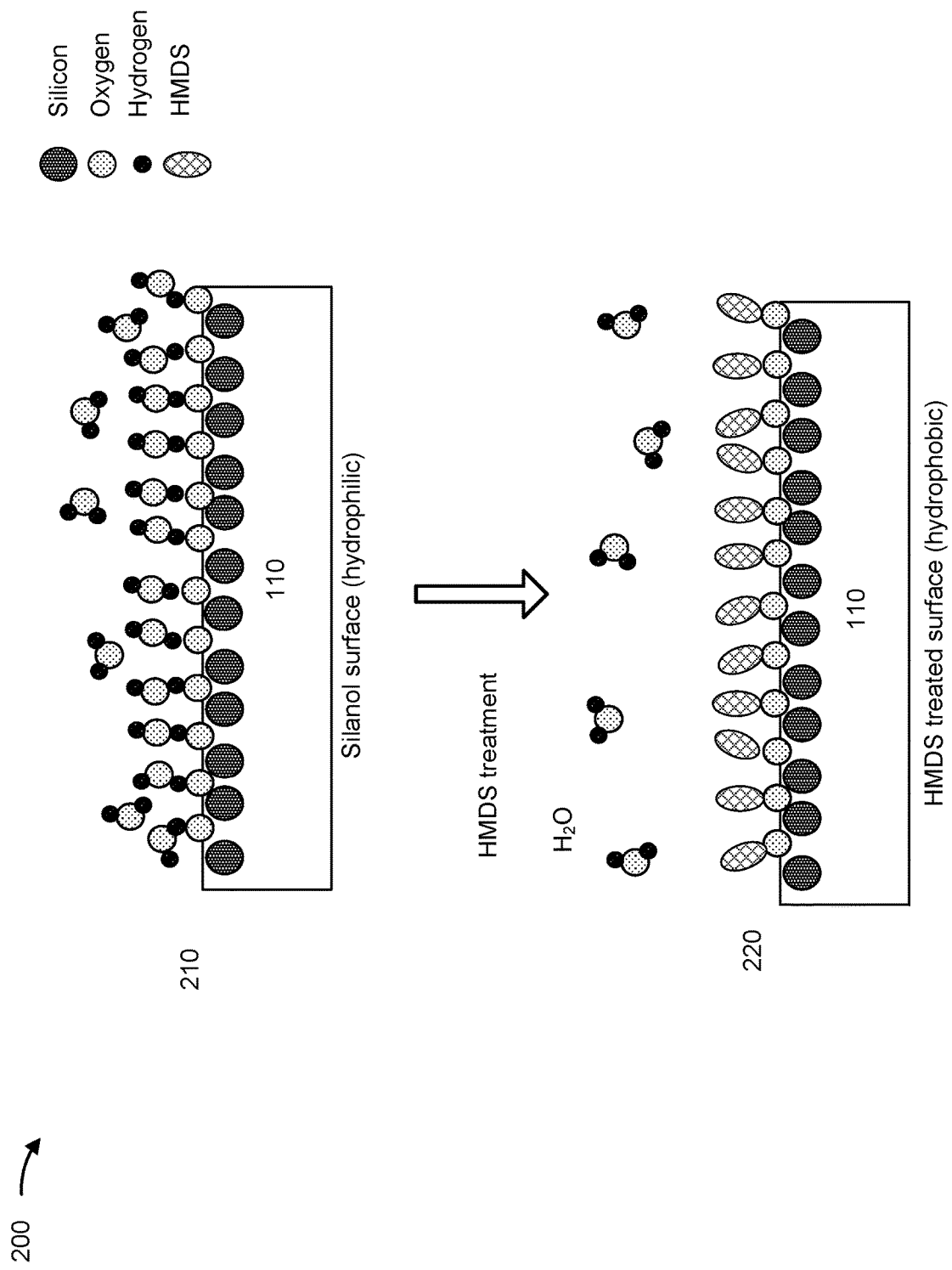
FIGS. 2 and 3 are diagrams of an example optical component with a hydrophobic surface coating.
Figure 3:
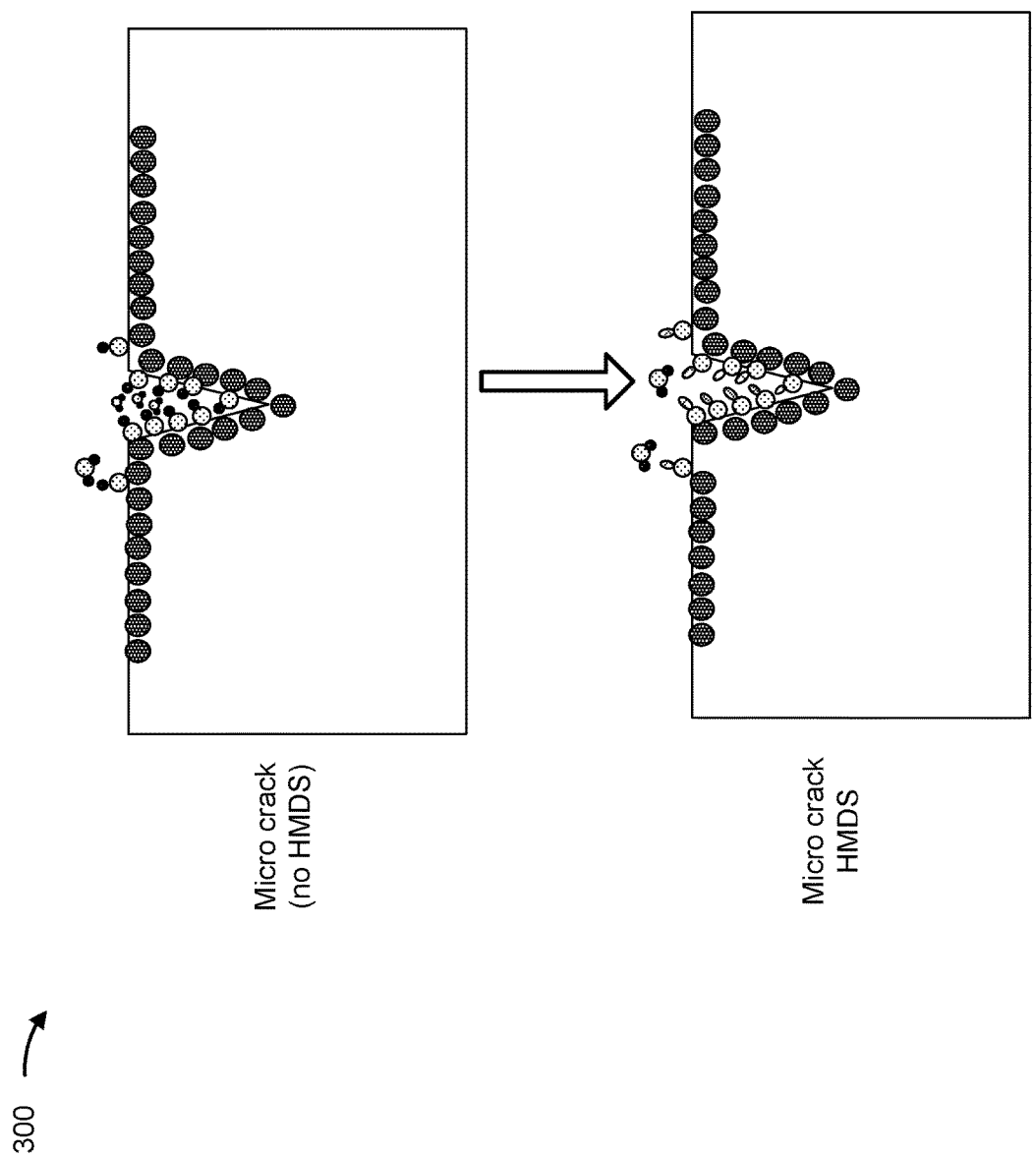

FIGS. 2 and 3 are diagrams of an example optical component 200 with a hydrophobic surface coating. In some implementations, the example optical component 200 may include an optical medium 110, such as an optical fiber, a fiber laser, a fiber combiner, a fiber taper, a fiber Bragg grating (FBG), a fiber cladding light stripper, a fiber long period grating, a fiber splice (e.g., a mismatched splice in which two sides of the splice have respective diameters that differ by a threshold amount), a photonic lantern, a bulk optic (e.g., an optical medium that can be formed into another type of optical component), or a component thereof, among other examples.

As shown in FIG. 2, an optical medium 110 may include a surface 210. In some implementations, the surface 210 is a post-processing surface (e.g., after removal of a coating material). For example, as described above, processing of the optical medium 110 may result in a hydrophobic siloxane surface transitioning to a hydrophilic silanol surface 210. Additionally, or alternatively, other types of processing may be applied to the surface 210, such as stripping a polymer coating, cleaning, heating, or chemical altering, among other examples. Additionally, or alternatively, the surface 210 may be an unprocessed surface. For example, the optical medium 110 may have a hydrophilic surface 210 (e.g., with having been processed). In another example, rather than being a hydrophilic surface 210, the surface 210 may be less hydrophobic than is desired. For example, the hydrophobic siloxane surface, described above, may transition to a less hydrophobic surface or a neutral surface rather than transitioning to a hydrophilic surface. In this case, rather than changing the surface 210 from hydrophilic to hydrophobic, some implementations, may change the surface from neutral to hydrophobic or from less hydrophobic to more hydrophobic or from more hydrophilic to less hydrophilic or neutral.

In some implementations, rather than a silica-based optical medium 110, another type of optical medium may be used, such as an fluoride-based optical medium, a phosphate-based optical medium, a chalcogenide-based optical medium, or an crystal optical medium, that is less hydrophobic than is desirable for a particular use case. Additionally, or alternatively, the optical medium 110 may have different forms, such as fiber-based forms or bulk optic forms, among other examples. In these examples, rather than a hydrophilic silanol surface 210, the optical medium 110 may have a different type of surface that is less hydrophobic than is desired for a particular use case, as described herein.

As further shown in FIG. 2, in some implementations, a chemical treatment can be applied to the optical medium 110 and the surface 210. For example, the optical medium 110 may be coated in an HMDS material to form an HMDS layer on an exterior of the optical medium 110. Additionally, or alternatively, the optical medium 110 may be coated with a polysiloxane material to form a polysiloxane layer, an organofluorine material to form an organofluorine layer, an organosilicon to form an organosilicon layer, a polydimethylsiloxane material to form a polydimethylsiloxane layer, or a fluoro-polymer material to form a fluoro-polymer layer, among other examples.

In some implementations, the chemical treatment may be a dipping treatment. For example, the optical medium 110 may be dipped in a liquid HMDS treatment resulting in methyl groups of the liquid HMDS treatment bonding with oxygen molecules of the silanol surface 210. In this case, the optical medium 110 may be dipped for a threshold amount of time to enable a chemical reaction between the liquid HMDS treatment and the silanol surface 210, such as an amount of time in a range of 1 second (s) to 100 s. Additionally, or alternatively, the chemical treatment may be a vapor deposition treatment or another type of coating treatment.

In some implementations, the optical medium 110 may be subjected to a procedure to ensure that the optical medium 110 is coated (e.g., to a threshold percentage of surface being coated or with a threshold level of uniformity). For example, the optical medium 110 may be agitated or a liquid coating material (e.g., HMDS) may be agitated to ensure adequate coating of the optical medium 110 (e.g., coating of at least a threshold percentage of an exterior of the optical medium 110 or coating of microcracks in the exterior of the optical medium 110 to a threshold depth).

In some implementations, a drying procedure may be applied to the optical medium 110 after a coating procedure. For example, the optical medium 110 may be subject to a period of drying (which may include forced convection drying) of between 1 minute and 5 days. In some implementations, another type of procedure, such as a curing procedure, may be applied. For example, the optical medium 110 with the a coating disposed thereon may be subjected to a heat source, a light source (e.g., light with a particular configured bandwidth), or another type of curing source to ensure that the coating is deposited on the optical medium 110 and retained thereon.

Based on the chemical treatment (e.g., an HMDS treatment) and a chemical reaction between the chemical treatment and the surface 210, the surface 210 may transition to a treated surface 220. For example, the treated surface 220 (e.g., an HMDS surface, a polysiloxane surface, or polydimethylsiloxane surface among other examples) may be a hydrophobic surface, thereby reducing water-based deposition of contaminants and/or water-based hydrolysis. In some implementations, the treated surface 220 may achieve a particular level of being hydrophobic. For example, the treated surface 220 may achieve a contact angle of at least 45 degrees (°) when exposed to water molecules, in contrast with the silanol surface which may have a contact angle of less than 45°.

In some implementations, the treated surface 220 may be a monolayer protective coating. For example, the treated surface 220 may have a thickness of less than a threshold amount such as less than 50 nm, less than 25 nm, less than 10 nm, or less than 5 nm, among other examples. In some implementations, the treated surface 220 may be a multi-layer protective coating. For example, the treated surface 220 may have a plurality of layers of HMDS or another material or a combination of materials. In some implementations, the treated surface 220 may be non-monolithic. For example, when the optical medium 110 has a surface with microcracks, the treated surface 220 may partially fill the microcracks, as shown in FIG. 3 and by example 300, or conform to the surface with the microcracks. In some implementations, the treated surface 220 has less than a threshold level of absorption in a particular spectral range (e.g., at which the optical component 200 operates, such as the infrared spectrum or a portion thereof, such as a spectral range of 750 nm to 2100 nm). For example, the treated surface 220 may have, in the particular spectral range, absorption of less than 50%, less than 25%, less than 10%, less that 5%, less than 1%, or less than 0.1%, among other examples.

In some implementations, the optical component 200 may be provided without a sealed environment. For example, in contrast with the optical media 110 of FIG. 1E that are recoated or included in a housing, the presence of the treated surface 220 protects the optical medium 110 from water-based surface contaminants and/or water-based hydrolysis. Accordingly, the optical medium 110 of the optical component 200 can be disposed in a non-sealed environment (e.g., exposed to environmental contaminants and water, which may be prevented from deposition or interaction with the optical medium 110 by the treated surface 220). In this case, the optical component 200 may not need to be provided in a sealed environment, thereby enabling increased miniaturization of optical systems that include the optical component 200 by obviating a need for providing a sealed environment for the optical component 200.

As indicated above, FIGS. 2 and 3 are provided as examples. Other examples may differ from what is described with regard to FIGS. 2 and 3.

Figure 4:
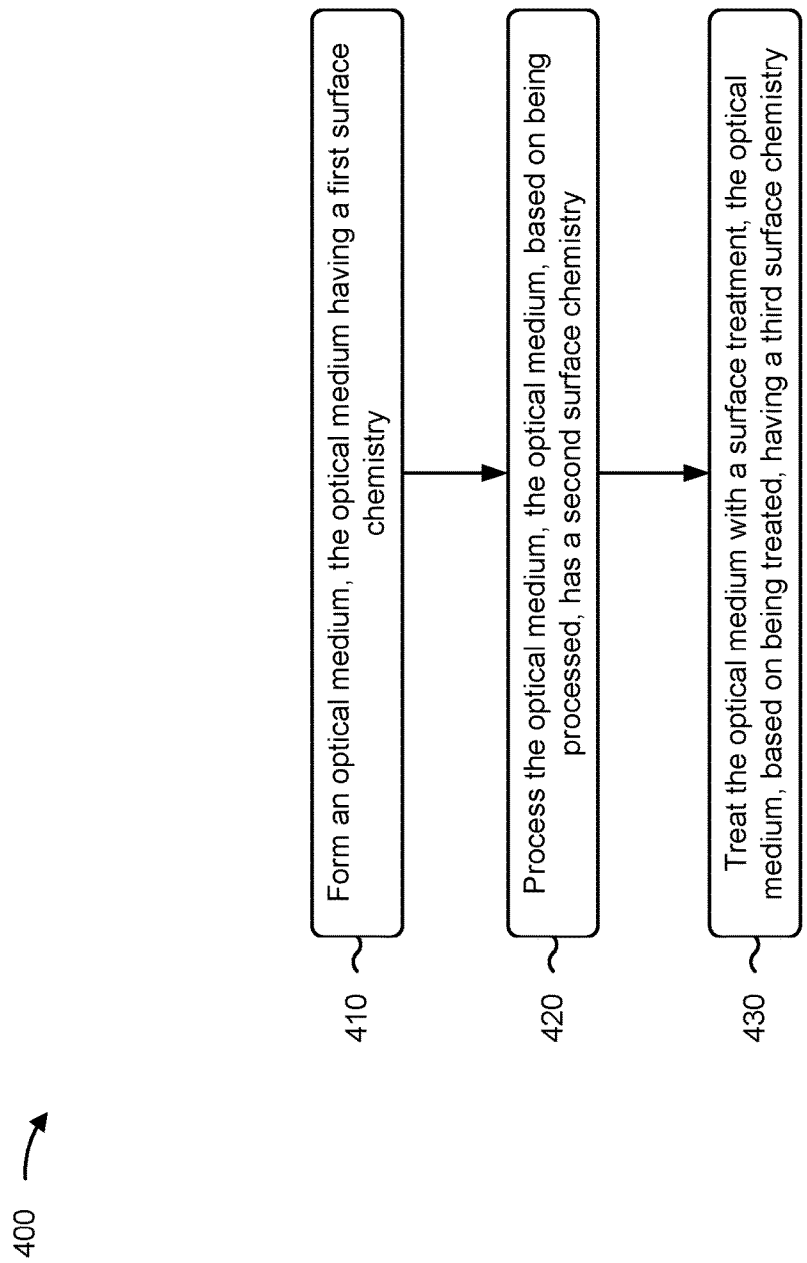
FIG. 4 is a flowchart of an example process associated with manufacturing an optical component with a hydrophobic surface coating.

FIG. 4 is a flowchart of an example process 400 associated with manufacturing an optical component with a hydrophobic surface coating. In some implementations, one or more process blocks of FIG. 4 are performed by a manufacturing device (e.g., a fiber draw device or a chemical treatment device).

As shown in FIG. 4, process 400 may include forming an optical medium, the optical medium having a first surface chemistry (block 410). For example, the manufacturing device may form an optical medium having a first surface chemistry, as described above. In some implementations, the first surface chemistry is hydrophobic.

As further shown in FIG. 4, process 400 may include processing the optical medium, the optical medium based on being processed, has a second surface chemistry (block 420). For example, the manufacturing device may process the optical medium to have a second surface chemistry, as described above. In some implementations, the second surface chemistry being less hydrophobic than the first surface chemistry.

As further shown in FIG. 4, process 400 may include treating the optical medium with a surface treatment, the optical medium, based on being treated, has a third surface chemistry (block 430). For example, the manufacturing device may treat the optical medium with a surface treatment to cause the optical medium to have a third surface chemistry, as described above. In some implementations, the third surface chemistry being more hydrophobic than the second surface chemistry Process 400 may include additional implementations, such as any single implementation or any combination of implementations described below and/or in connection with one or more other processes described elsewhere herein.

In a first implementation, the first surface chemistry is a set of siloxane molecules.

In a second implementation, alone or in combination with the first implementation, the second surface chemistry is a set of silanol molecules.

In a third implementation, alone or in combination with one or more of the first and second implementations, processing the optical fiber comprises removing at least a portion of the polymer coating to expose at least a portion of the optical fiber.

In a fourth implementation, alone or in combination with one or more of the first through third implementations, processing the optical fiber comprises heating the optical fiber, the heating the optical fiber causing a transition from the first surface chemistry to the second surface chemistry.

In a fifth implementation, alone or in combination with one or more of the first through fourth implementations, treating the optical fiber comprises dipping the optical fiber in an HMDS treatment, and drying the optical fiber based on dipping the optical fiber.

In a sixth implementation, alone or in combination with one or more of the first through fifth implementations, process 400 includes splicing a first end of the optical fiber to a second end of another optical fiber, the first end of the optical fiber and the second end of the other optical fiber being exposed, and recoating the first end of the optical fiber and the second end of the other optical fiber with another polymer coating.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical component, comprising:
   an optical medium, the optical medium comprising a fiber having a surface,
     wherein the optical medium is disposed in a non-sealed environment,
     wherein a first portion of the fiber has a first diameter,
     wherein a second portion of the fiber has a second diameter that is different than the first diameter, and
     wherein the surface includes one or more hydroxyl group terminations before application of a surface layer; and
   the surface layer chemically bonded to the surface of the fiber, such that the surface layer has a thickness of less than 10 nanometers and is a hydrophobic surface,
     the surface layer including at least one of:
       a hexamethyldisilazane material,
       a polysiloxane material,
       a polydimethylsiloxane material,
       a fluoro-polymer material,
       an organosilicon material, or
       an organofluorine material.

2. The optical component of claim 1,
   wherein the surface layer has less than 5% absorption in a spectral range of 750 nanometers (nm) to 2100 nm.

3. The optical component of claim 1,
   wherein the surface layer is bonded to the one or more hydroxyl group terminations.

4. The optical component of claim 1,
   wherein the optical medium is at least one of:
     a silica-based optical medium,
     a fluoride optical medium,
     a phosphate optical medium,
     a chalcogenide optical medium, or
     a crystal optical medium.

5. The optical component of claim 1,
   wherein the optical medium forms at least a part of at least one of:
     a fiber laser,
     a fiber combiner,
     a fiber taper,
     a fiber Bragg grating,
     a fiber cladding light stripper,
     a fiber long period grating,
     a fiber splice,
     a photonic lantern, or
     a bulk glass.

6. The optical component of claim 1, further comprising:
   a polymer coating material, wherein the polymer coating material covers a first portion of the optical medium not covered by the surface layer.

7. An optical system, comprising:
   an optical medium, the optical medium comprising a fiber having a surface layer chemically bonded to an exterior of the fiber, such that the surface layer is a hydrophobic surface,
     wherein the optical medium is disposed in a non-sealed environment,
     wherein a first portion of the fiber has a first diameter,
     wherein a second portion of the fiber has a second diameter that is different than the first diameter, and
     wherein the surface layer is a hexamethyldisilazane (HMDS) layer bonded to the exterior; and
   a coating material,
     wherein the coating material covers a portion of the optical medium not covered by the surface layer.

8. The optical system of claim 7,
   wherein another portion of the optical medium is exposed and not covered by the coating material.

9. The optical system of claim 7,
   wherein the optical medium forms a fused combiner.

10. The optical system of claim 7,
    wherein the exterior includes a set of silanol group terminations reacted with the HMDS layer.

11. The optical system of claim 7,
    wherein the HMDS layer is disposed within one or more microcracks in the exterior.

12. The optical system of claim 7,
    wherein the optical medium is at least one of:
      a silica-based optical medium,
      a fluoride optical medium,
      a phosphate optical medium,
      a chalcogenide optical medium, or
      a crystal optical medium.

* * * * *